Patented May 29, 1928.

1,671,455

UNITED STATES PATENT OFFICE.

JOHN THOMAS, OF CARLISLE, ENGLAND, ASSIGNOR TO SCOTTISH DYES, LIMITED, OF CARLISLE, ENGLAND.

PRODUCTION OF ANTRAQUINONE SULPHONIC ACIDS.

No Drawing. Application filed June 19, 1924, Serial No. 721,118, and in Great Britain August 31, 1923.

The invention deals with the production of alpha-sulphonic acids of anthraquinone.

The object of the invention is to provide an improved or modified process in which the materials are used in a very economical manner.

In order to prepare alpha-sulphonic acids of anthraquinone, a charge is made as follows, viz:

| | Parts by weight |
|---|---|
| Anthraquinone recovered from a previous melt | 70 |
| Benzoyl-ortho-benzoic acid | 325 |
| Oleum of 65 per cent strength | 450 |
| Mercury sulphate | 4.8 |

The mercury sulphate, benzoyl-ortho-benzoic acid and anthraquinone are mixed together and added to the oleum at such a rate that the temperature is not allowed to exceed 100° C. After the addition is complete, the temperature is slowly raised to 150° C. and kept at 150° C. for 45 minutes. If the temperature is raised too quickly there is a tendency for the heat of the reaction to raise the temperature above 150° C. when higher proportions of disulphonic acids are formed. The melt is poured into 3,000 parts water, boiled and filtered hot. The residue is again boiled with 1,000 parts water, filtered and the unchanged anthraquinone is washed acid free and dried.

To the combined filtrates 8 parts of caustic potash are added, the mixture boiled, allowed to cool and filtered. The potassium salt is washed acid free with 5 per cent potassium chloride solution, and the wet paste is weighed and dried. The amount of potassium chloride present can then be calculated. The filtrates are now saturated with salt and the precipitated disulphonic acids filtered off, washed acid free with 25 per cent brine, the wet paste weighed and dried.

In the above, the yields were 83 parts of recovered anthraquinone, 270 parts of potassium salt of anthraquinone-alpha-sulphonic acid, 99 parts of sodium salts of anthraquinone disulphonic acids.

For the purposes of this invention in place of benzoyl-ortho-benzoic acid itself derivatives of this body may be employed.

The mercury sulphate referred to herein is intended to refer to mercurous sulphate.

Similarly where the word "oleum" is used the equivalent of oleum in sulphuric acid is included.

Having now described my invention what I claim as new and desire to secure by Letters Patent is:

1. A method for the production of α-sulphonic acids of anthraquinone which consists in mixing together about 4.8 parts of mercury sulphate, 325 parts of benzoyl-ortho-benzoic acid, 70 parts of anthraquinone recovered from a previous melt and adding this mixture to about 450 parts of 65 per cent oleum at such a rate that the temperature is not allowed to exceed 100° C. and after the addition is complete slowly raising the temperature to about 150° C. and maintaining it there for about 45 minutes, subsequently working up the melt, isolating anthraquinone sulphonic acid and recovering anthraquinone.

2. A method for the production of α-sulphonic acids of anthraquinone which consists in mixing together about 4.8 parts of mercury sulphate, 325 parts of benzoyl-ortho-benzoic acid, 70 parts of anthraquinone recovered from a previous melt and adding this mixture to about 450 parts of 65 per cent oleum at such a rate that the temperature is not allowed to exceed 100° C. and after the addition is complete slowly raising the temperature to about 150° C. and maintaining it there for about 45 minutes, subsequently pouring the melt into about 3,000 parts of water, separating the precipitate, treating the filtrates with alkali, separating the alkali salt, treating this latter with sodium chloride and thus precipitating the sulphonic acids.

In testimony whereof I have signed my name to this specification.

JOHN THOMAS.